UNITED STATES PATENT OFFICE.

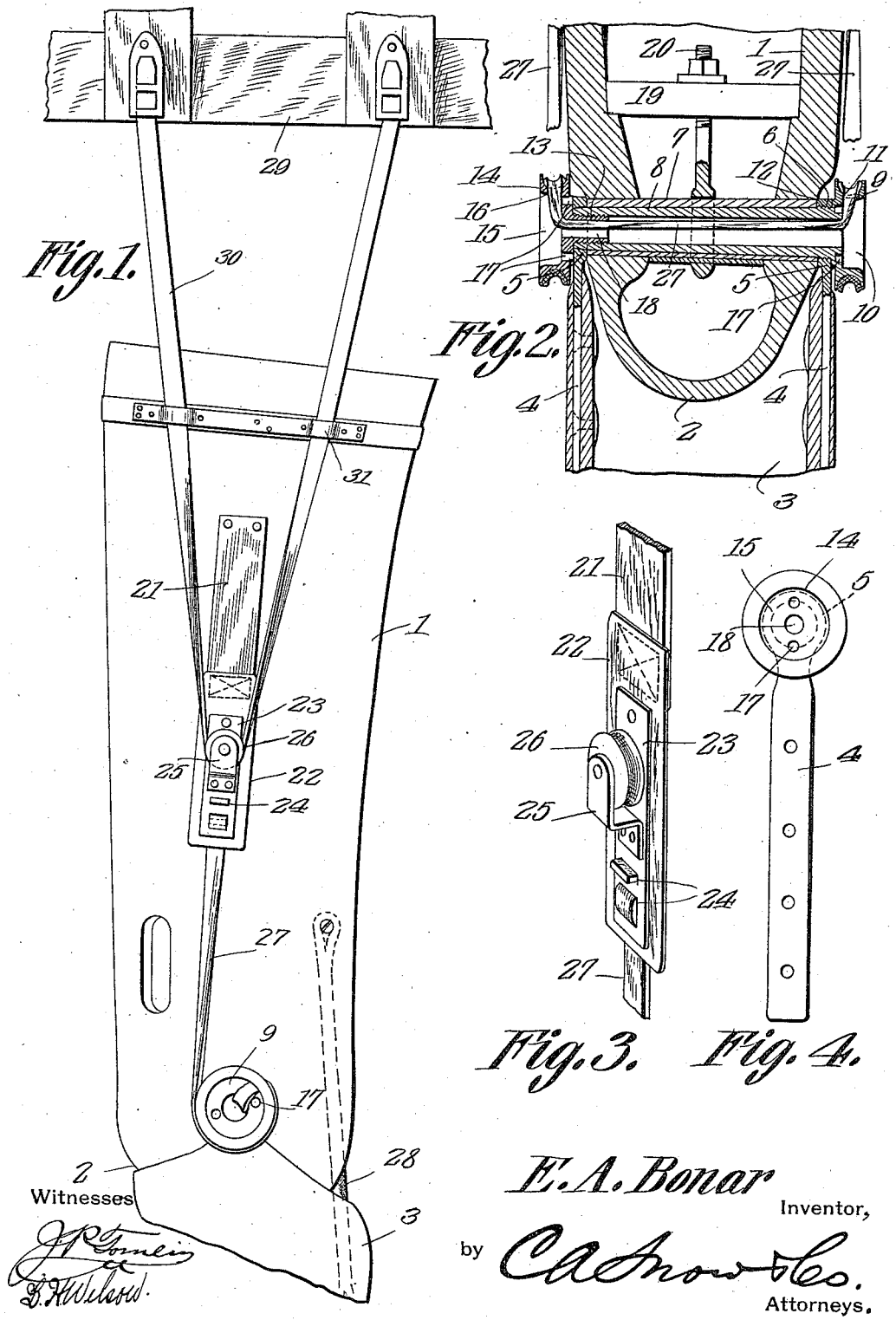

EDDIE A. BONAR, OF DETROIT, MICHIGAN.

ARTIFICIAL LEG.

1,044,980.    Specification of Letters Patent.    Patented Nov. 19, 1912.

Application filed July 26, 1912. Serial No. 711,675.

*To all whom it may concern:*

Be it known that I, EDDIE A. BONAR, a citizen of the United States, residing at Detroit, in the county of Wayne and State of Michigan, have invented a new and useful Artificial Leg, of which the following is a specification.

This invention relates to artificial legs and more particularly to improvements in the knee joints thereof.

One of the objects of the invention is to provide means whereby when the knee is flexed and ready to be brought forward, the thigh section will be prevented from slipping down on the stump and chafing it, this being due to the fact that a novel connection is provided between the leg fastening means and the knee joint whereby flexing of the joint will result in taking up any slack occurring in the fastening means.

Another object is to provide improved means for connecting the joint operatively to the leg fastening means, said connecting means being readily adjustable without the necessity of utilizing special fastening devices.

A further object is to provide mechanism of this character which can be applied to any artificial leg already constructed provided the same utilizes a knee bolt of the standard type.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a side elevation of a portion of an artificial leg having the present improvements combined therewith. Fig. 2 is a transverse section through the knee joint. Fig. 3 is a perspective view of one of the connecting buckles.
Fig. 4 is a side elevation of the knee bolt and one of its connecting straps.

Referring to the figures by characters of reference 1 designates the hollow thigh section of the ordinary form, the lower end thereof being reduced and rounded, as shown at 2 and projecting into the upper end of the lower leg section 3. Secured within said section 3 at diametrically opposed points are straps 4 each of which is provided, at its upper end, with an eye 5, one of these eyes being interiorly screw threaded, as indicated at 6 in Fig. 2. These eyes are located close to the upper end of the section 3 at the sides thereof and extending through the lower portion of the section 1 is a bearing sleeve 7 which registers with the eyes. A tubular tapered bolt 8 extends through the eyes 5, said bolt being provided at one end with a sheave 9 the outer face of which is recessed, as at 10, there being an opening 11 in the periphery of the sheave and communicating with the recess 10. Screw threads 12 are formed on the bolt 8 close to the sheave 9 and engage the threads 6 in one of the eyes. The other end of the bolt and which is fitted loosely within the other eye 5, is interiorly screw threaded and receives a threaded nipple 13 extending from the center of one side of a sheave 14 likewise formed, in its outer face with a recess 15, there being an opening 16 in the periphery of the sheave and communicating with the recess. Oppositely disposed wrench receiving recesses 17 are formed in the sheaves and the nipple 13 has a passage 18 extending therethrough and opening into recess 15. The hollow bolt 8 likewise opens into the center of the recess 10 in sheave 9.

For the purpose of holding the bearing sleeve 7 and the bolt 8 against displacement relative to the leg section 1, a cross strip 19 is seated within the section 1 and is engaged by an eye bolt 20, the bearing sleeve 7 being extended through the eye of the bolt.

Secured to each side of the thigh section 1 is an elastic strap 21 the free end of which has a tab 22 of leather or the like fixed thereto. Riveted or otherwise secured on this shaft is a plate 23 having preferably three parallel slots 24 in one end portion thereof, it being understood that the tab 22 is to be correspondingly slotted. A bracket 25 extends outwardly from the plate 23 and a sheave 26 is journaled therein. A flexible strip 27, preferably formed of rawhide, is threaded through the bolt 8 and the nipple 13 and thence through the peripheral openings 11 and 16. From these peripheral openings the strip 27 passes under the sheaves 9 and 14 and thence upwardly to the plates 23 at the sides of section 1. The ends of the strip 27 are threaded through the slots 24 so that the said strip can thus be adjustably but securely connected to the plates 23 without the use of any special fastening devices. The parts are so proportioned that when the strip 27 is thus secured at its ends the elastic straps are held under tension and therefore serve to hold the section 3 substantially in alinement with the thigh section 1. Movement of the section 3 under the action of the elastic straps 21 is limited by a stop cord 28 which is arranged in the two sections 1 and 3 and secured thereto above and below the knee joint respectively.

Any suitable means may be employed for fastening the leg to the body. For example a belt, a portion of which has been shown at 29, may be used and adjustable supporting strips 30 may be extended downwardly therefrom to opposite sides of the thigh section 1 and under the respective sheaves 26. Guide strips 31 or the like may be attached to the sides of the thigh section for engagement by the strips 30 so as to thus hold the leg against displacement.

From the foregoing description it will be seen that, when the section 3 is swung back at the knee joint the sheaves 9 and 14 will move therewith and take up strip 27 so as thus to pull on the plates 23 and the elastic straps 21. At the same time the sheaves 26 will be caused to pull down on the strips 30 so as thus to take up any slack which may occur in said strips and prevent the leg from slipping downward upon the stump.

Importance is attached to the particular arrangement of the sheaves 9 on the knee bolt for the reason that a considerable leverage is thus obtained upon the lower section of the leg and the said section will be thrown forward quickly so that a person using the leg can walk with a greater speed than would otherwise be possible.

What is claimed is:—

1. An artificial leg including upper and lower sections, a tubular knee bolt extending therethrough and constituting the pivotal connection therebetween, sheaves at the ends of the bolt and movable with the lower section, a flexible element secured to and extending partly around the sheaves and through the bolt, and elastic connections between said element and the upper section.

2. An artificial leg including upper and lower sections, a tubular knee bolt extending therethrough and constituting the pivotal connection therebetween, sheaves at the ends of the bolt and movable with one section, a flexible element secured to and extending partly around the sheaves and through the bolt, elastic connections between said element and the other section, flexible means for fastening the leg to the body, and means for movably connecting said flexible means to the flexible element.

3. An artificial leg including upper and lower sections, a tubular knee bolt extending therethrough and constituting the pivotal connection therebetween, sheaves at the ends of the bolt and movable with one section, a flexible element secured to and extending partly around the sheaves and through the bolt, elastic connections between said element and the other section, means for adjustably securing said connections to the flexible element, sheaves movable with the flexible element, and flexible means engaging said sheaves for fastening said leg to the body.

In testimony that I claim the foregoing as my own, I have hereto affixed my signature in the presence of two witnesses.

EDDIE A. BONAR.

Witnesses:
J. W. ULRICK,
L. BARNES.

---

Copies of this patent may be obtained for five cents each, by addressing the "Commissioner of Patents, Washington, D. C."